United States Patent
Randall et al.

(10) Patent No.: US 12,168,374 B2
(45) Date of Patent: Dec. 17, 2024

(54) PNEUMATIC TIRE HAVING DAMPENING ELEMENT ADHERED TO AIR BARRIER LAYER

(71) Applicant: Bridgestone Americas Tire Operations, LLC, Nashville, TN (US)

(72) Inventors: Amy M. Randall, Brentwood, TN (US); Craig R. Balnis, Aberdeen, NC (US); David J. Zemla, Canal Fulton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 214 days.

(21) Appl. No.: 16/461,663

(22) PCT Filed: Nov. 16, 2017

(86) PCT No.: PCT/US2017/061984
§ 371 (c)(1),
(2) Date: May 16, 2019

(87) PCT Pub. No.: WO2018/094026
PCT Pub. Date: May 24, 2018

(65) Prior Publication Data
US 2019/0351717 A1    Nov. 21, 2019

Related U.S. Application Data

(60) Provisional application No. 62/423,389, filed on Nov. 17, 2016.

(51) Int. Cl.
*B60C 19/00*    (2006.01)
(52) U.S. Cl.
CPC .................................. *B60C 19/002* (2013.01)

(58) Field of Classification Search
CPC ....... B60C 19/002; B60C 11/11; B32B 27/00; B29D 30/0061; B29D 30/0601; B29C 33/64
See application file for complete search history.

(56) References Cited

U.S. PATENT DOCUMENTS

| | | |
|---|---|---|
| 3,935,893 A | 2/1976 | Stang et al. |
| 4,149,579 A | 4/1979 | Senger |

(Continued)

FOREIGN PATENT DOCUMENTS

| | | |
|---|---|---|
| CN | 102585733 | 9/2013 |
| CN | 203438785 | 2/2014 |

(Continued)

OTHER PUBLICATIONS

EESR for European Application No. 17870726.1 dated Jun. 23, 2020, pp. 1-7.

(Continued)

*Primary Examiner* — Christopher M Rodd
*Assistant Examiner* — Shibin Liang
(74) *Attorney, Agent, or Firm* — Meredith E. Hooker; Arthur M. Reginelli

(57) ABSTRACT

A method of preparing a tire including the steps of providing a cured tire, the tire including a first bead, a second bead, a carcass layer extending from the first bead to the second bead, and an optional innerliner layer disposed interior to the carcass layer; directly or indirectly applying an air barrier composition to at least a portion of the carcass layer or to at least a portion of the optional innerliner layer to thereby form an air barrier layer; and directly or indirectly applying a dampening member to the air barrier layer.

8 Claims, 2 Drawing Sheets

(56) References Cited

U.S. PATENT DOCUMENTS

| | | | |
|---|---|---|---|
| 4,539,344 | A | 9/1985 | Van Ornum et al. |
| 4,874,670 | A * | 10/1989 | Boon ................. B32B 25/00 |
| | | | 428/423.9 |
| 4,895,610 | A | 1/1990 | Egan |
| 5,099,900 | A | 3/1992 | Gomberg |
| 6,179,941 | B1 | 1/2001 | Yamakawa et al. |
| 6,230,773 | B1 | 5/2001 | Sandstrom et al. |
| 6,253,814 | B1 | 7/2001 | Peyron |
| 6,454,857 | B1 | 9/2002 | Glasner et al. |
| 6,755,483 | B2 | 6/2004 | Yukawa et al. |
| 6,779,572 | B2 | 8/2004 | Tabor et al. |
| 8,146,635 | B2 | 4/2012 | Sekiguchi |
| 8,251,114 | B2 | 8/2012 | Takahashi |
| 8,316,903 | B2 | 11/2012 | Majumdar et al. |
| 8,360,122 | B2 | 1/2013 | Wilson |
| 8,430,143 | B2 | 4/2013 | Tanno et al. |
| 8,534,331 | B2 * | 9/2013 | Dubos ................. B60C 1/0008 |
| | | | 152/158 |
| 8,602,075 | B2 | 12/2013 | Albert et al. |
| 8,617,334 | B2 | 12/2013 | Ruegg, Jr. et al. |
| 9,421,824 | B2 | 8/2016 | Pulford et al. |
| 9,796,144 | B2 | 10/2017 | Elsawah |
| 10,843,425 | B2 * | 11/2020 | Berenguer ......... B29D 30/0685 |
| 2004/0140042 | A1 | 6/2004 | Teratani et al. |
| 2005/0155686 | A1 | 7/2005 | Yukawa et al. |
| 2006/0272760 | A1 | 12/2006 | Teratani et al. |
| 2007/0185269 | A1 | 8/2007 | Fukutomi et al. |
| 2008/0078489 | A1 | 4/2008 | Fukutomi et al. |
| 2008/0173382 | A1 | 7/2008 | Gobinath et al. |
| 2008/0257476 | A1 | 10/2008 | Pozzati et al. |
| 2009/0084482 | A1 | 4/2009 | Ramendra et al. |
| 2009/0211683 | A1 | 8/2009 | Takahashi |
| 2009/0211693 | A1 | 8/2009 | Zawadzki et al. |
| 2009/0272476 | A1 | 11/2009 | Wilson |
| 2010/0043937 | A1 | 2/2010 | Matsunaga |
| 2010/0071820 | A1 | 3/2010 | Noggle et al. |
| 2010/0130640 | A1 | 5/2010 | Okamatsu et al. |
| 2011/0146860 | A1 | 6/2011 | Ramendra et al. |
| 2011/0308704 | A1 | 12/2011 | Sandstrom et al. |
| 2011/0308705 | A1 * | 12/2011 | Sandstrom ............ B29D 30/08 |
| | | | 156/123 |
| 2011/0308706 | A1 | 12/2011 | Sandstrom et al. |
| 2011/0315291 | A1 | 12/2011 | Abad et al. |
| 2012/0125507 | A1 * | 5/2012 | Bormann ........... B29D 30/0681 |
| | | | 427/244 |
| 2012/0125525 | A1 | 5/2012 | Majumdar et al. |
| 2012/0285597 | A1 | 11/2012 | Abad et al. |
| 2012/0291933 | A1 * | 11/2012 | Tanno ................. B60C 19/002 |
| | | | 152/209.18 |
| 2013/0032262 | A1 | 2/2013 | Bormann et al. |
| 2013/0087267 | A1 | 4/2013 | Sandstrom et al. |
| 2013/0146195 | A1 | 6/2013 | Dubos et al. |
| 2015/0151592 | A1 | 6/2015 | Hamanaka et al. |
| 2015/0174970 | A1 | 6/2015 | Baeuning et al. |
| 2015/0306914 | A1 | 10/2015 | Pulford et al. |
| 2016/0001612 | A1 | 1/2016 | Joo et al. |
| 2016/0032215 | A1 | 2/2016 | Voge |
| 2016/0052349 | A1 | 2/2016 | Elsawah |
| 2016/0101657 | A1 | 4/2016 | Majumdar et al. |
| 2016/0347127 | A1 | 12/2016 | Yukawa |
| 2017/0313132 | A1 | 11/2017 | Kresge et al. |
| 2017/0341324 | A1 * | 11/2017 | Lee ...................... B05B 7/0025 |
| 2019/0092103 | A1 | 3/2019 | Giannini et al. |

FOREIGN PATENT DOCUMENTS

| | | | |
|---|---|---|---|
| CN | 102634300 | | 6/2014 |
| DE | 102005050677 | A1 | 4/2007 |
| DE | 102009024454 | A1 | 12/2010 |
| EP | 2006125 | A1 | 12/2008 |
| EP | 2277688 | A1 | 1/2011 |
| EP | 2335913 | A1 | 6/2011 |
| EP | 2397347 | A1 | 12/2011 |
| GB | 2024225 | A * | 1/1980 ......... B29D 30/0685 |
| JP | 2002-332475 | A | 11/2002 |
| JP | 2009-269446 | A | 11/2009 |
| JP | 2010-513121 | A | 4/2010 |
| JP | 2011020479 | A | 2/2011 |
| JP | 2012121413 | A | 6/2012 |
| WO | 2003028986 | A1 | 4/2003 |
| WO | 2012134454 | A1 | 4/2012 |
| WO | 2014198432 | A1 | 12/2014 |
| WO | 2015019138 | | 2/2015 |
| WO | 2015115486 | A1 | 8/2015 |
| WO | 2015149959 | A1 | 10/2015 |
| WO | 2015165899 | A1 | 11/2015 |
| WO | 2015166412 | A1 | 11/2015 |
| WO | 2016099695 | A1 | 6/2016 |
| WO | 2017/163219 | A1 | 9/2017 |

OTHER PUBLICATIONS

Office Action for Japanese Application No. 2019-526219 dated Jun. 16, 2020.
EESR for European Application No. 17872331.8 dated May 25, 2020 pp. 1-7.
EESR for European Application No. 17871040.6 dated Jun. 9, 2020, pp. 1-8.
Office Action for U.S. Appl. No. 15/814,954 dated Mar. 4, 2020, pp. 1-8.
International Search Report and Written Opinion dated Mar. 7, 2018 for application No. PCT/US2017/061984.
Okel et al.; A Materials Approach to Fuel-Efficient Tires; Project ID # VS0884; May 18, 2012.
Martin et al.; A Materials Approach to Fuel-Efficient Tires; Project ID # VS0884; Jun. 19, 2014.
Kornish et al.; Final Technical Report for DOE/EERE (Materials Approach to Fuel-Efficient Tires); DE-EE0005359; Apr. 2, 2016.
International Search Report and Written Opinion dated Mar. 13, 2018 for application No. PCT/US2017/061889.
International Search Report and Written Opinion dated Mar. 13, 2018 for application No. PCT/US2017/061890.

* cited by examiner

PNEUMATIC TIRE HAVING DAMPENING ELEMENT ADHERED TO AIR BARRIER LAYER

This application is a National-Stage application of PCT/US2017/061984 filed on Nov. 16, 2017, which claims the benefit of U.S. Provisional Application Ser. No. 62/423,389 filed on Nov. 17, 2016, which are incorporated herein by reference.

FIELD OF THE INVENTION

Embodiments of the present invention generally relate to pneumatic tires and, more particularly, to pneumatic tires having a dampening element directly or indirectly adhered to an air barrier layer.

BACKGROUND OF THE INVENTION

In the art of making pneumatic tires, it is known to include an air permeation resistant film, which may be referred to as an air-resistant film or air barrier, in the inner surface of the tire in order to prevent air permeation from the inner air chamber. For example, U.S. Pat. No. 5,738,158 teaches a pneumatic tire having an air permeation prevention layer composed of a thin resin film including a thermoplastic polyester elastomer. The air permeation prevention layer can be adhered to the rubber tire by using various adhesive systems including isocyanate-based adhesives in conjunction with heat and pressure at the time of vulcanization and molding.

Pneumatic tires have also been modified by applying dampening elements to the interior of the tire. These dampening elements reduce or dampen the resonance noise created by operation of the tire, which noise is believed to be caused when the air in the air cavity of the tire is excited by vibrations at specific frequencies. For example, U.S. Pat. No. 6,755,483 discloses a dampening element fixed to the interior of a pneumatic tire; i.e. fixed to the reverse face of a tread. The dampening element is fixed by using an adhesive agent such as a synthetic-rubber-based adhesive.

SUMMARY OF THE INVENTION

One or more embodiments of the present invention provide a method of preparing a tire comprising the steps of (i) providing a cured tire, the tire including a first bead, a second bead, a carcass layer extending from the first bead to the second bead, and an optional innerliner layer disposed interior to the carcass layer; (ii) directly or indirectly applying an air barrier composition to at least a portion of the carcass layer or to at least a portion of the optional innerliner layer to thereby form an air barrier layer; and (iii) directly or indirectly applying a dampening member to the air barrier layer.

Other embodiments of the present invention provide a pneumatic tire comprising a tread; a carcass; an optional innerliner layer; an air barrier layer directly or indirectly disposed on at least a portion of the carcass; and a dampening element directly or indirectly disposed on the air barrier layer.

DETAILED DESCRIPTION OF ILLUSTRATIVE EMBODIMENTS

Embodiments of the present invention are based, at least in part, on pneumatic tires that include a dampening element, which may also be described as a dampening member, and an air barrier layer disposed on the interior surface of the tire. In one or more embodiments, both the dampening element and the air barrier layer are applied after the tire is cured. While the prior art contemplates pneumatic tires with air resistant films, these air resistant films are applied prior to curing the tire. The present invention applies the air barrier layer to the interior of a cured tire. In one or embodiments, the air barrier layer may advantageously provide a surface that is receptive to an adhesive used for mating a dampening element to the interior of the tire.

Tire Structure

Figure 1:
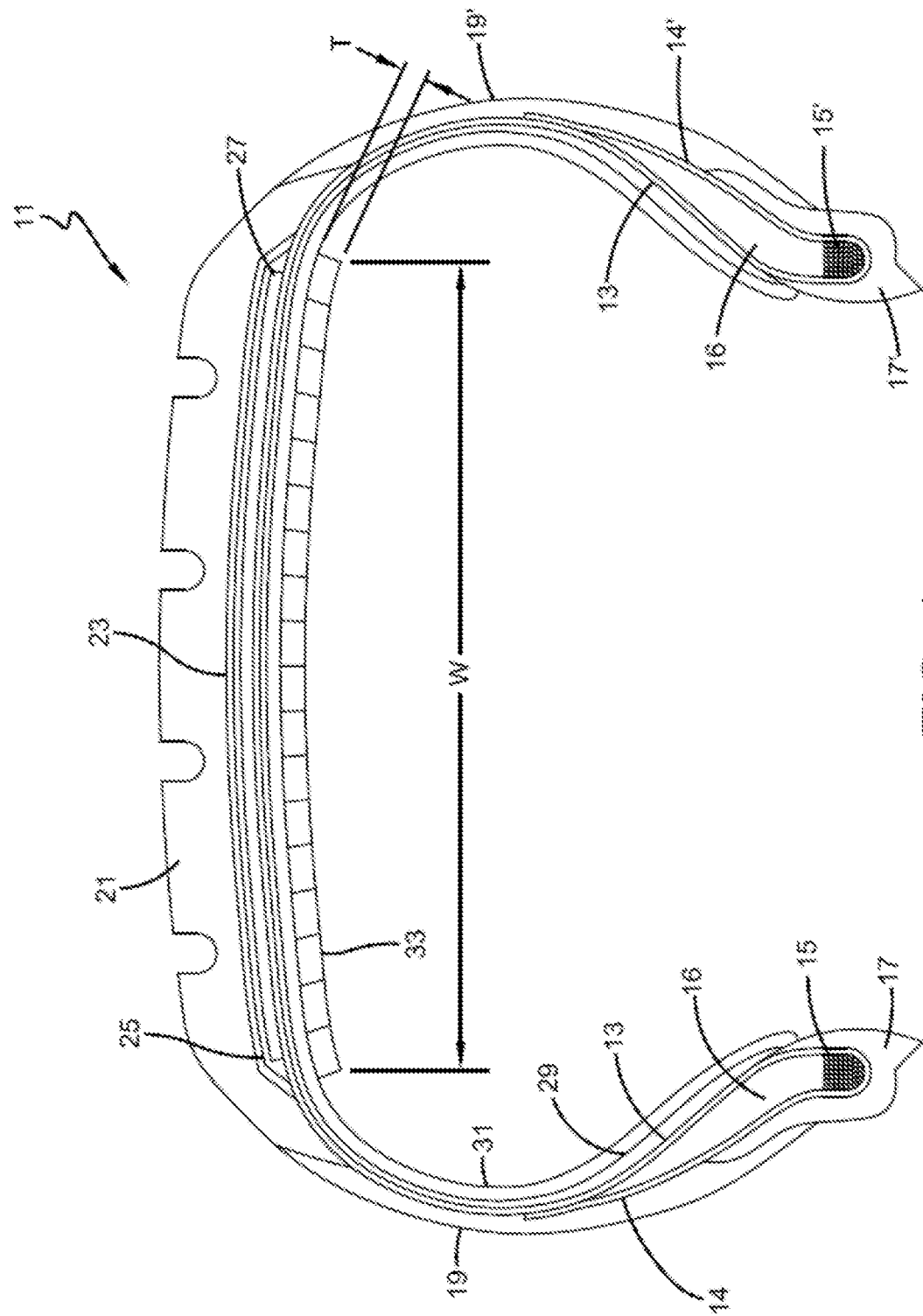
FIG. 1 is a cross-sectional view of a tire according to one or more embodiments of the invention.
Figure 2:
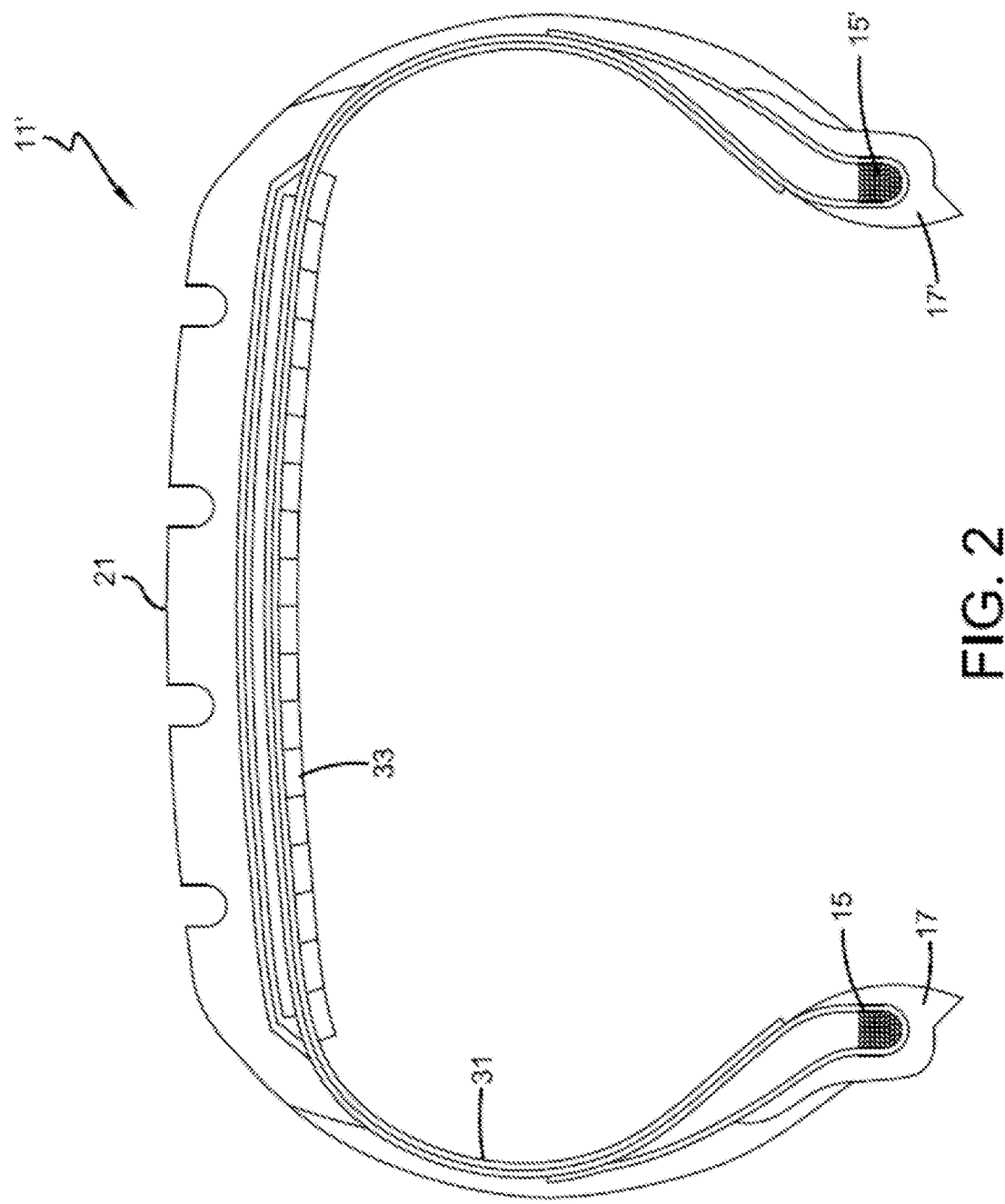
FIG. 2 is a cross-sectional view of a tire according to one or more embodiments of the invention.

Aspects of the invention can be described with reference to FIGS. 1 and 2, which show tires 11 and 11', respectively, including carcass 13 extending between a pair of axially-spaced beads 15, 15'. Carcass 13 includes opposed turn-up portions 14, 14', which thereby cause body ply 13 to surround bead filler portions 16, 16', respectively. Abrasion strips 17, 17' partially encase body ply 13 at or near beads 15, 15'. Tire 11 further includes opposing sidewalls 19, 19', and tread portion 21, which forms the outermost circumferential surface of tire 11. Subtread 23 is disposed below tread 21, undertread 25 is disposed below subtread 23, and belt package 27 is disposed below undertread 25. Belt package 27, which may include a plurality of belts (not shown) is positioned above carcass 13, which itself may include one or more body plies (not shown). As shown only in FIG. 1, an innerliner 29 is disposed on the interior of carcass 13 relative to tread 21. FIG. 2, on the other hand, is devoid of an innerliner 29. As the skilled person will appreciate, tire 11 may also include various other components, which are not shown, such as, but not limited to, tread shoulders, cap plies, belt wedges, and belt shoulders.

According to embodiments of the present invention, tire 11 and 11' further include an air barrier layer 31 and a dampening element 33, which may also be referred to as dampening member 33, noise-reducing member 33, vibration-reducing member 33, sound-absorbing member 33, damper 33, vibration damper 33, or noise damper 33. As shown in FIG. 1, air barrier layer 31 is disposed on the interior of innerliner 29 relative to tread 21 and generally extends from a location proximate to first abrasion strip 17 to a location proximate second abrasion strip 17'. In alternate embodiments, as shown in FIG. 2, where tire 11' is without a separate innerliner portion, air barrier layer 31 is disposed directly on carcass 13 and generally extends from first abrasion strip 17 to second abrasion strip 17' (i.e. generally throughout the entire inner surface of carcass 13).

Dampening element 33 is disposed below air barrier 31 (i.e. interior to air barrier layer 31) relative to tread 21. In one or more embodiments, dampening element 33 has a width W that generally extends with the width of the tread 21 (i.e. generally from sidewall 19 to sidewall 19'. In one or more embodiments, dampening element 33 is generally coextensive with at least 90%, in other embodiments at least 70%, and in other embodiments at least 50% of the width of tread 21. In one or more embodiments, dampening element 33 circumferentially extends over the almost entire inner circumference of tire 11. As also shown in the figures, damper 33 includes a thickness T extending from the surface where damper 33 contacts air barrier layer 31 to the inner most surface of damper 33 opposite tread 21.

Although not shown in the drawings, the tires of the present invention may include a layer of an adhesive layer between air barrier layer 31 and the inner most surface of damper 33. As disclosed elsewhere herein, air barrier layer 31 may advantageously mate with innerliner 29 or carcass 13. Air barrier layer 31 may provide a layer or substrate that is more receptive to or more compatible with an adhesive that may be used to mate and bond damper 33 to innerliner 29 or carcass 13 as compared to directly mating damper 33 to innerliner 29 or carcass 13. In other embodiments, air barrier layer 31 serves to directly mate and bond damper 33 to innerliner 29 or carcass 13.

The adhesive layer may include a variety of adhesives including those known it the art for bonding to cured rubber surfaces. In one more embodiments, the adhesive layer may derive from a pressure sensitive adhesive (e.g. a tape), or in other embodiments, the adhesive layer may derive from an adhesive cement (e.g. reactive adhesives and/or solvent borne adhesives).

In one or more embodiments, the adhesive agent may have advantageous adhesion to dampening element 33. In one or more embodiments, the adhesive agent may have an adhesion to the dampening element (e.g. dampening element 33) of more than 3 N/mm, in other embodiments more than 5 N/mm, in other embodiments more than 10 N/mm, in other embodiments more than 15 N/mm, in other embodiments more than 20 N/mm, and in other embodiments more than 30 N/mm. In one or more embodiments, the air barrier layer may have an adhesion to the carcass of from about 1 N/mm to about 30 N/mm, in other embodiments from about 3 N/mm to about 20 N/mm, and in other embodiments from about 3 N/mm to about 10 N/mm. The adhesion may be measured by ASTM D903 or ASTM D1876.

Although not shown in the drawings, the tires of the present invention may include a layer of an anti-tack composition applied to at least one of the innermost layers of the tire. In particular embodiments, the anti-tack composition, which may be referred to as an anti-tack coating, may be applied to cover an exposed dampening element 33, as shown in FIGS. 1 and 2. In particular embodiments, the anti-tack composition may include a composition including a polymeric resin selected from acrylic resins and/or vinyl acetate copolymers as disclosed in U.S. Publication No. 2003/0230369, which is incorporated herein by reference.

In yet other embodiments, tires of the present invention may include sidewall inserts (not shown in the Figs.) of the type generally known in the art for producing a self-supporting run flat tire. In this respect, U.S. Pat. Nos. 6,488,797; 6,834,696; and 5,769,980 are each incorporated herein by reference. In one or more embodiments, the air barrier layer can be disposed on the sidewall inserts.

Dampening Element

The dampening element of one or more embodiments of the invention dampening element 33) generally includes those elements that absorb energy frequencies that give rise to resonance sound or vibration within a tire. In or more embodiments, the dampening member is a porous member such as a foam member. The porous member may include a strip of sponge-like multi-cellular material including open-cell materials or, in other embodiments, closed-cell, isolated-cell materials. In one or more embodiments, the dampening element continuously extends in a circumferential direction. The dampening element may provide one or more properties of noise reduction, shock resistance dampening, and vibration reduction.

Practice of one or more embodiments of the invention is not necessarily limited by the selection of any particular composition for the dampening member (e.g. the foam). Various compositions are known for this particular purpose, as generally disclosed in U.S. Pat. Nos. 9,278,586; 8,567,464; 8,220,515; 7,874,329; 7,669,628; 7,188,652; 6,755,483; 6,422,655; U.S. Publication No. 2007/0085251; 2005/0205183; US 2012/0125507; US 2017/0157996; and PCT Patent Application No. WO2016/012946, all of which are incorporated herein by reference.

In one or more embodiments, dampening element 33 is a foamed polymeric material such as a foam plastic or foamed rubber. Polymeric materials that may be foamed include thermoplastic materials such as, but not limited to, polyolefins such as polyethylene and polypropylene, polyesters, and polyurethanes. An exemplary polyurethane is an ether based polyurethane.

In one or more embodiments, the foamed polymeric materials may include foamed rubbers (which may be referred to as sponge rubber) such as foamed chloroprene rubber (CR), ethylene-propylene-diene (EDPM) rubber, nitrile-butadiene rubber (NBR), silicone rubber, or combinations thereof.

In one or more embodiments, a silicone rubber foam has a specific gravity ranging from 0.01 to 0.4, in other embodiments, a specific gravity ranging from 0.015 to 0.3, in other embodiments, from 0.025 to 0.25. A suitable silicone rubber foam is the commercially available Magnifoam MF1-6535 having a density of 6.5 lb/ft$^3$ (specific gravity 0.1). Dampening elements employing closed-cell type silicone rubber foams may be particularly suitable for vibration reduction.

In one or more embodiments, a foamed polymeric material is a synthetic foam. Exemplary synthetic foams include those deriving from phenolic resins including those based upon naturally-derived phenols.

In one or more embodiments, a foamed polymeric material may be based on a polycondensate of polyphenolic compounds of natural or synthetic origins. In one or more embodiments, a foamed polymeric material may be based on flavonoid tannins. In one or more embodiments, a foamed polymeric material is prepared starting from flavonoid tannins, furfuryl alcohol, a foaming agent, and a catalyst.

In one or more embodiments, a dampening member is formed by applying a foamable liquid to a tire and foaming the foamable liquid. In one or more embodiments, a foamable liquid is a silicone rubber foam precursor.

In one or more embodiments, the composition of the dampening element is not sulfur crosslinked to an adjacent tire component. For example, in one or more embodiments, the composition of the dampening element is not sulfur crosslinked to an innerliner. In other embodiments, the dampening element is not sulfur crosslinked to the carcass.

In one or more embodiments, dampening element 33 is a fabric including woven and nonwoven fabrics. The fabrics can be prepared from various fibers that may be synthetic or natural fibers. Exemplary synthetic fibers include polyolefins such as polyalphaolefins, as well as polyesters, polyamides, and polyimides. Exemplary natural fibers include those deriving from plants and animals.

In one or more embodiments, damper 33 may include both a fabric and a foamed material.

In one or more embodiments, the dampening element includes an open-cell type polyurethane foam. These polyurethane foams may include ether-based or ester-based polyurethane foams. These polyurethane foams may be produced by common processes such as one-shot processes or prepolymer processes. Dampening elements employing polyurethane foams are disclosed in U.S. Pat. No. 8,220,515, which is incorporated herein by reference. Dampening elements employing open-cell type polyurethane foams may be particularly suitable for noise reduction. Dampening elements employing closed-cell type polyurethane foams may be particularly suitable for vibration reduction.

In one or more particular embodiments, the dampening element includes a synthetic foam prepared from naturally-derived phenol compounds. For example, the dampening element can be prepared foaming the reaction products of flavonoids (tannins), furfuryl alcohol, a foaming agent, and a catalyst. These dampening element compositions are disclosed in WO2016/0129946, which is incorporated herein by reference.

In one or more embodiments, the dampening element includes a water-impermeable outer coating to prevent water from infiltrating into the sponge-like multi-cellular material during transport, storage, and use of the tire. Dampening elements of this construction are disclosed in U.S. Publ. No. 2005/0205183, which is incorporated herein by reference.

In one or more embodiments, the dampening element may be characterized by a specific gravity of more than 0.005, in other embodiments more than 0.010, in other embodiments more than 0.01, in other embodiments more than 0.06. In one or more embodiments, the dampening element may be characterized by a specific gravity of less than 0.25, in other embodiments less than 0.06, in other embodiments less than 0.03, in other embodiments less than 0.02. In one or more embodiments, the dampening element may be characterized by a specific gravity of from about 0.005 to about 0.25, in other embodiments, from about 0.01 to about 0.06, and in other embodiments from about 0.06 to about 0.25.

In one or more embodiments, the dampening element may be characterized by an air permeability of less than 5 cc/cm$^2$/sec, in other embodiments less than 3 cc cm$^2$ sec, and in other embodiments less than 1 cc/cm$^2$/sec.

In one or more embodiments, the dampening element may be characterized based upon its volume relative to the volume of the inner cavity of the tire (i.e. the volume of the cavity absent the damper). In one or more embodiments, the volume of the dampening element is more than 0.4%, in other embodiments more than 1%, in other embodiments more than 2%, and in other embodiments more than 4% of the volume of the tire cavity. In one or more embodiments, the volume of the dampening element is less than 20%, in other embodiments less than 15%, and in other embodiments less than 10% of the volume of the tire cavity.

In one or more embodiments, the dampening element may be characterized by its ability to reduce noise. In one or more embodiments, the dampening element is able to reduce the noise by greater than 1 dB, in other embodiments, greater than 2 dB, and in other embodiments, greater than 3 dB. A sound absorption test can be performed according to the ISO 10534-2 Standard at a frequency ranging from 200 to 2000 Hz.

In one or more embodiments, the dampening element may have a thickness (e.g. thickness T of damper 33 of the figures) of greater than 3 mm, in other embodiments greater than 5 mm, in other embodiments greater than 10 mm, in other embodiments greater than 15 mm, in other embodiments greater than 20 mm, and in other embodiments greater than 25 mm. In these or other embodiments, the dampening element may have a thickness of less than 50 mm, in other embodiments less than 40 mm, in other embodiments less than 30 mm, in other embodiments less than 20 mm, and in other embodiments less than 10 mm.

In one or more embodiments, the dampening element may have a width (e.g. width W of damper 33 of the figures) of greater than 20 mm, in other embodiments greater than 40 mm, in other embodiments greater than 50 mm, in other embodiments greater than 60 mm, in other embodiments greater than 70 mm, and in other embodiments greater than 90 mm. In these or other embodiments, the dampening element may have a width of less than 150 mm, in other embodiments less than 120 mm, in other embodiments less than 100 mm, in other embodiments less than 80 mm, in other embodiments less than 60 mm, and in other embodiments less than 50 mm.

Air Barrier Layer

In one or more embodiments, the air barrier layer (e.g. air barrier layer 31) may be generally described with respect to one or more properties of the air barrier layer.

The air barrier layer of one or more embodiments of the present invention (e.g. air barrier layer 31) generally includes a polymeric layer that has low permeability to air; i.e. low permeability to oxygen, nitrogen and carbon dioxide. The low permeability to air may be described in terms of the oxygen permeability ($P(O_2)$), which may also be referred to as oxygen permeance. The $P(O_2)$ number quantifies the amount of oxygen that can pass through the polymeric layer under a specific set of circumstances and is generally expressed in units of cc·mm/m$^2$·day·atm. This is a standard unit of permeation measured as cubic centimeters of oxygen permeating through one millimeter thickness of a sample, of an area of a square meter, over a 24 hour period, under a partial pressure differential of one atmosphere at a specific temperature and relative humidity (R.H.) conditions. In one or more embodiments, the oxygen permeability ($P(O_2)$) may be measured in accordance with ASTM method F1927-14 which measures $O_2$ transmission rates at 23° C. at 50% relative humidity.

In one or more embodiments, the air barrier layer of the tires of the present invention (e.g. air barrier layer 31) may have a $P(O_2)$ of less than 500, in other embodiments less than 250, in other embodiments less than 150, in other embodiments less than 100, in other embodiments less than 80, and in other embodiments less than 50, cc·mm/m$^2$·day·atm. In one or more embodiments, the air barrier layer may have a $P(O_2)$ of from about 0.01 to about 500 cc·mm/m$_2$·day·atm, in other embodiments from about 0.1 to about 100 cc·mm/m$^2$·day·atm, in other embodiments from about 50 to about 100 cc·mm/m$^2$·day·atm, and in other embodiments from about 50 to about 80 cc·mm/m$^2$·day·atm.

In one or more embodiments, the air barrier layer of the tires of the present invention (e.g. air barrier layer 31) may have advantageous adhesion to another component of the tire. The adhesion may be measured by ASTM 0903 or ASTM 01876.

In one or more embodiments, the air barrier layer of the tires of the present invention (e.g. air barrier layer 31) may have an adhesion to the carcass (e.g. carcass 13) of more than 5 N/mm, in other embodiments more than 10 N/mm, in other embodiments more than 15 N/mm, in other embodiments more than 30 N/mm, and in other embodiments more than 50 N/mm. In one or more embodiments, the air barrier layer may have an adhesion to the carcass of from about 1 N/mm to about 50 N/mm, in other embodiments from about 5 N/mm to about 30 N/mm, and in other embodiments from about 5 N/mm to about 15 N/mm.

In one or more embodiments, the air barrier layer of the tires of the present invention (e.g. air barrier layer 31) may have an adhesion to the innerliner (e.g. innerliner 29) of more than 5 N/mm, in other embodiments more than 10 N/mm, in other embodiments more than 15 N/mm, in other embodiments more than 30 N/mm, and in other embodiments more than 50 N/mm. In one or more embodiments, the air barrier layer may have an adhesion to the innerliner of from about 1 N/mm to about 50 N/mm, in other embodiments from about 5 N/mm to about 30 N/mm, and in other embodiments from about 5 N/mm to about 15 N/mm.

In one or more embodiments, the air barrier layer of the tires of the present invention (e.g. air barrier layer 31) may have an adhesion to the dampening element (e.g. dampening element 33) of more than 3 N/mm, in other embodiments more than 5 N/mm, in other embodiments more than 10 N/mm, in other embodiments more than 15 N/mm, in other embodiments more than 20 N/mm, and in other embodiments more than 30 N/mm. In one or more embodiments, the air barrier layer may have an adhesion to the carcass of from about 1 N/mm to about 30 N/mm, in other embodiments from about 3 N/mm to about 20 N/mm, and in other embodiments from about 3 N/mm to about 10 N/mm.

The air barrier layer of one or more embodiments of the present invention (e.g. air barrier layer 31) may be generally characterized with respect to the composition of the air barrier layer.

Practice of one or more embodiments of the invention is not necessarily limited by the selection of any particular air barrier composition for the air barrier layer. Various air barrier compositions are known for this particular purpose, as generally disclosed in U.S. Pat. Nos. 5,840,825; 6,309,757; 6,521,706; 7,730,919; 7,798,188; 7,905,978; 7,954,528; 7,976,666; 8,021,730; 8,534,331; and 8,835,592; and U.S. Publication Nos. 2008/0047646; 2009/0038727; 2008/0152935; 2010/0174032; and 2015/0368512 which are incorporated herein by reference.

In one or more embodiments, an air barrier composition may include two or more polymeric components, each having a distinct glass transition temperature ($T_g$). In one or more embodiments, the two or more polymeric components may be sufficiently blended to provide the blended composition with a glass transition temperature that is distinct from the glass transition temperatures of the two or more polymeric components. In one or more embodiments, the air barrier layer composition of one or more embodiments of the present invention includes at least one glass transition temperature ($T_g$) peak, from one component of the air barrier layer, of less than −20° C., in other embodiments, less than −30° C., and in other embodiments, less than −40° C. Glass transition temperature may be measured by differential scanning calorimetry. In these or other embodiments, the air barrier layer composition includes a second glass transition temperature ($T_g$) peak of greater than 0° C., in other embodiments, greater than 10° C., and in other embodiments greater than 20° C.

In one or more embodiments, an air barrier composition is a polymeric composition including a thermoplastic and elastomeric component. In one or more embodiments, the air barrier layer is phase-separated polymeric system wherein an elastomeric component is phase separated from a thermoplastic component (e.g. soft and hard domains). In certain embodiments, the thermoplastic component is dispersed within the elastomeric component. In other embodiments, the elastomeric component is dispersed within the thermoplastic component. In yet other embodiments, the thermoplastic component and the elastomeric component are co-continuous. An exemplary embodiment includes a first phase with a polyurethane and a second phase with a polysulfide elastomer, and in certain embodiments, the polyurethane provides the continuous phase while polysulfide forms the discontinuous phase.

In one or more embodiments, an air barrier layer may be formed from an air barrier coating composition that is an aqueous dispersion or latex. In one or more embodiments, this aqueous dispersion may include more than 10 wt. % solids, in other embodiments more than 20 wt. % solids, in other embodiments more than 25 wt. % in other embodiments more than 40 wt. % solids, and in other embodiments more than 45, wt. % solids. In one or more embodiments, an aqueous medium having a dispersion of one or more polymeric materials therein may include from about 10 to about 45 wt. % solids, in other embodiments from about 20 to about 40 wt. % solids, and in other embodiments from about 20 to about 25 wt. % solids.

In particular embodiments, the air barrier layer includes a blend of polyurethane and elastomeric polymer. As disclosed in U.S. Publ. No. 2010/0174032, which is incorporated herein by reference, the polyurethane may include a polyurethane wherein at least 30 wt % of the mer units derive from a meta-substituted aromatic material, such as a meta-substituted aromatic isocyanate. In these or other embodiments, as disclosed in U.S. Publ. No. 2015/0368512, which is incorporated herein by reference, these compositions may derive from aqueous dispersions of polyurethane, a polysulfide, and a curative such as magnesium oxide. In one or more embodiments, an air barrier composition can include aqueous dispersed polyurethanes. In one or more embodiments, an air barrier composition can include aqueous dispersed polyvinylidene chloride copolymers.

In one or more embodiments, the polyurethane can have reactive functional groups. As used here, a reactive functional group refers to an atom, group of atoms, functionality, or group having sufficient reactivity to form at least one covalent bond with another reactive group in a chemical reaction. For example, a polyurethane can include reactive functional groups that are reactive with themselves or with another component, such as a crosslinker. Examples of reactive functional groups include mercapto or thiol groups, hydroxyl groups, (meth)acrylate groups, carboxylic acid groups, amine groups, epoxide groups, carbamate groups, amide groups, urea groups, isocyanate groups (including blocked isocyanate groups), and combinations thereof.

In one or more embodiments, a polyurethane can be substantially free or completely free of reactive functional groups. As used here, the term substantially free means a polyurethane may contain less than 1000 parts per million (ppm), and completely free means less than 20 parts per billion (ppb), of reactive functional groups. In one or more embodiments, a polyurethane may include aqueous dispersed polyurethanes that are completely free of reactive functional groups.

In one or more embodiments, an air barrier composition may include thermoplastic polymer (e.g. polyurethane) in an amount of more than 5 wt. %, in other embodiments, more than 10 wt. %, and in other embodiments, more than 15 wt. %, based on the total solid weight of the air barrier composition. In one or more embodiments, an air barrier composition may include thermoplastic polymer in an amount of less than 75 wt. %, in other embodiments, less than 50 wt. %, in other embodiments, less than 35 wt. %, and in other embodiments, less than 20 wt. %, based on the total solid weight of the air barrier composition. In one or more embodiments, an air barrier composition may include thermoplastic polymer in an amount of from about 5 wt. % to about 75 wt. %, in other embodiments, from about 10 wt. % to about 50 wt. %, and in other embodiments, from about 10 wt. % to about 20 wt, %, based on the total solid weight of the air barrier composition. The weight % may be determined by standard gel permeation chromatography.

In one or more embodiments, an air barrier composition includes a polysulfide. The polysulfide may act as an elastomeric material in the air barrier layer. The term polysulfide refers to a polymer that contains one or more disulfide linkages (i.e. —[S—S]—) linkages, in the polymer backbone, and/or in the terminal or pendant positions on the polymer chain. A polysulfide polymer can have two or more sulfur-sulfur linkages. A polysulfide can also include a mixture of primary disulfides and higher rank polysulfides such as tri and tetra polysulfide linkages (S—S—S; S—S—S—S). Further, a polysulfide can include mercapto or thiol functional groups (an —SH group). For instance, a polysulfide can be represented by chemical formula (I)

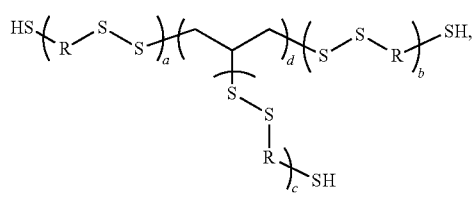
(I)

where each R can independently be —($CH_2$—$CH_2$—O—$CH_2$—O—$CH_2$—$CH_2$)— and a+b+c+d can be a number up to and including 1,000. A polysulfide that can be used with the present invention can also be represented by chemical formula (II):

where n can be a number up to and including 1,000. Exemplary polysulfides are those commercially available under the trade name THIOPLAST®, a liquid polysulfide polymer with mercapto end groups supplied by Akzo Nobel, Greiz, Germany.

In one or more embodiments, a polysulfide can have a glass transition temperature ($T_g$) of less than 0° C., as measured by differential scanning calorimetry. In other embodiments, a polysulfide can have a glass transition temperature f less than −10° C., in other embodiments, less than −20° C., and in other embodiments, less than −30° C.

In one or more embodiments, an air barrier composition may be substantially free or may be completely free of all other elastomeric materials, except for polysulfides. As used here, the term substantially free means an air barrier composition may contain less than 1000 parts per million (ppm), and completely free means less than 20 parts per billion (ppb), of all other elastomeric materials, except for polysulfides.

In other embodiments, an air barrier composition may include a polysulfide and an additional elastomeric material. Exemplary additional elastomeric materials that can be used include acrylonitriles, natural and synthetic rubbers such as aqueous butyl rubber dispersions, styrenic thermoplastic elastomers, polyamide elastomers, thermoplastic vulcanizates, flexible acrylic polymers, and combinations thereof.

In one or more embodiments, an air barrier composition may include elastomeric polymer (e.g. polysulfide) in an amount of more than 5 wt. %, in other embodiments, more than 10 wt. %, in other embodiments, more than 15 wt. %, in other embodiments, more than 25 wt. %, and in other embodiments, more than 50 wt. %, based on the total solid weight of the air barrier composition. In one or more embodiments, an air barrier composition may include elastomeric polymer in an amount of less than 80 wt. %, in other embodiments, less than 75 wt. %, and in other embodiments, less than 70 wt. %, based on the total solid weight of the air barrier composition. In one or more embodiments, an air barrier composition may include elastomeric polymer in an amount of from about 5 wt. % to about 80 wt. %, in other embodiments, from about 25 wt. % to about 75 wt. %, and in other embodiments, from about 50 wt. % to about 70 wt, %, based on the total solid weight of the air barrier composition. The weight % may be determined by standard gel permeation chromatography.

In one or more embodiments, an air barrier composition may include one or more inorganic materials. As used herein, an inorganic material refers to materials and substances that are not organic, i.e., do not include carbon-based materials. The one or more inorganic materials may include one or more platy inorganic fillers. As used herein, a platy inorganic filler refers to an inorganic material in the platy form. The term platy refers to a structure in which one dimension is substantially smaller than the two other dimensions of the structure resulting in a flat type appearance. The platy inorganic fillers are generally in the form of stacked lamellae, sheets, platelets, or plates with a relatively pronounced anisometry. The inorganic materials, such as the platy inorganic fillers, can further improve the barrier performance of the resulting air barrier layer by reducing the permeability of liquids and gases.

Suitable platy inorganic fillers can include those having a high aspect ratio. Suitable high aspect ratio platy inorganic fillers include, for example, vermiculite, mica, talc, wollastonite, chlorite, metal flakes, platy clays, and platy silicas. In one or more embodiments, a filler has a diameter of from 1 to 20 microns, in other embodiments, from 2 to 10 microns, and in other embodiments, from 2 to 5 microns. In one or more embodiments, the aspect ratio of the fillers can be at least 5:1, in other embodiments, at least 10:1, and in other embodiments, at least 20:1. For example, mica flakes may have an aspect ratio of 20:1, talc may have an aspect ratio of 10:1 to 20:1, and vermiculite may have an aspect ratio of from 200:1 to 10,000:1.

In one or more embodiments, as disclosed in U.S. Pat. No. 8,534,331, the air barrier layer includes a two-phase system where an elastomer is dispersed within a thermoplastic matrix. In certain embodiments, the thermoplastic may include nylon and the elastomer may include butyl rubber and/or a sulfur-curable diene based elastomer.

In one or more embodiments, an air barrier composition may include a rheology agent. As generally known to those skilled in the art, rheology agents are those materials that help to improve the flow properties of a composition. An exemplary rheology agent is a polypropylene glycol solution of a urea modified polyurethane In one or more embodiments, the air barrier layer of the tires of the present invention (e.g. air barrier layer 31) may have a thickness of more than 8 mils, in other embodiments more than 10 mils, in other embodiments more than 14 mils, and in other embodiments more than 16 mils. In these or other embodiments, the air barrier layer may have a thickness of less than 28 mils, in other embodiments less than 25 mils, in other embodiments less than 20 mils, and in other embodiments less than 18 mils. In one or more embodiments, the air barrier layer may have a thickness of from about 5 mils to about 28 mils, in other embodiments from about 8 mils to about 25 mils, in other embodiments from about 10 mils to about 22 mils, and in other embodiments from about 15 mils to about 20 mils.

In one or more embodiments, the composition of the air barrier layer is not sulfur crosslinked to an adjacent tire component. For example, in one or more embodiments, the composition of the air barrier layer is not sulfur crosslinked to the innerliner. In other embodiments, the composition of the air barrier layer is not sulfur crosslinked to the carcass.

In one or more embodiments, the composition of the air barrier layer is sulfur crosslinked to an adjacent tire component. For example, in one or more embodiments, the composition of the air barrier layer is sulfur crosslinked to the innerliner. In other embodiments, the composition of the air barrier layer is sulfur crosslinked to the carcass.

Other Tire Components

The various tire components associated with the tires of the present invention may be prepared from conventional vulcanizable compositions of matter. Accordingly, practice of one or embodiments of the present invention does not alter conventional practice for preparing the various tire components. Generally speaking, these vulcanizable compositions may include an elastomer, a filler, and a curative, as well as other ingredients including, but not limited to, antidegradants, cure activators, cure accelerators, oils, resins, plasticizers, pigments, fatty acids, zinc oxide, and peptizing agents.

Rubber

As suggested above, the various tire components can be prepared using a vulcanizable composition that includes a rubber. In one or more embodiments, the rubber, which may also be referred to as a vulcanizable rubber or elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms. In particular embodiments, a vulcanizable composition includes a blend of natural rubber and synthetic diene rubber such as polybutadiene. In other embodiments, a vulcanizable composition includes olefinic rubber such ethylene-propylene-diene rubber (EPDM).

Filler

As suggested above, the various tire components can be prepared using a vulcanizable composition that includes a filler. The filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 $m^2/g$, in other embodiments at least 35 $m^2/g$, in other embodiments at least 50 $m^2/g$, in other embodiments at least 60 $m^2/g$; surface area values can be determined by ASTM D-1765 using the cetyltrimethylammonium bromide (CTAB) technique. In particular embodiments, a vulcanizable composition includes carbon black filler having a surface area (EMSA) of from about 60 to about 110 $m^2/g$. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano) polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Curative

As suggested above, the various tire components can be prepared using a vulcanizable composition that includes a curative. A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3rd Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2nd Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Other ingredients that are typically employed in rubber compounding may also be added to the rubber compositions employed for fabricating the various components of the tires of the invention. These include oils, plasticizer, waxes, scorch inhibiting agents, processing aids, zinc oxide, tackifying resins, reinforcing resins, fatty acids such as stearic acid, and peptizers. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Method of Preparing Tires

The tires of the invention may be fabricated by employing conventional rubber shaping, molding, and curing techniques. In one or more embodiments, vulcanization can be effected by heating the vulcanizable composition within a mold. In one or more embodiments, the composition can be heated at an internal temperature from about 120° C. to about 180 CC.

The cured or crosslinked rubber compositions (i.e., vulcanizates) generally include three-dimensional polymeric networks that are thermoset. Other ingredients, such as processing aids and fillers, are generally dispersed throughout the vulcanized network. Tire preparation is discussed in U.S. Pat. Nos. 5,866,171, 5,875,527, 5,931,211, and 5,971,046, which are incorporated herein by reference. Rubber compounding techniques and the additives employed therein are generally known as also disclosed in The Compounding and Vulcanization of Rubber, in Rubber Technology ($2^{nd}$ Ed. 1973), which is incorporated herein by reference.

As suggested in the Figures, the tires of the present invention can be prepared with or without an innerliner component. In one or more embodiments, where an innerliner is present, the innerliner is co-cured and therefore sulfur-crosslinked to the other rubber components such as the adjacent carcass or body plies.

Method of Applying Air Barrier

As indicated above, the air barrier layer associated with the tires of this invention is applied after a cured tire is provided. In other words, the air barrier layer is applied to a tire that has undergone the vulcanization (i.e. curing) process associated with the manufacture of the tire.

Thus, once a cured tire has been provided, the air barrier layer is applied to the tire. This air barrier layer may be applied to the tire by the direct application of a liquid or otherwise flowable composition that forms a wet or green coating that then dries or cures to form the air barrier layer. In other embodiments, the air barrier layer is applied through a transfer coating; i.e. a liquid or otherwise flowable composition that forms a wet or green coating is applied to a transfer substrate, such as a release member, the wet or green coating is allowed to dry or otherwise cure into a solids composition, and then the solids composition is applied to the tire and the transfer substrate is removed.

As suggested by the drawings, in one or more embodiments, the air barrier may be applied directly to the innerliner layer of a cured tire. In other embodiments, where the cured tire is provided without a separate innerliner, the air barrier layer may be applied directly to the body ply or tire carcass.

In one or more embodiments, an intermediary layer is disposed below the air barrier (i.e. interior to the air barrier layer). The intermediary layer can include a primer layer and a release agent layer, or a combination thereof.

In one or more embodiments, a primer layer may be present where there is a desire to improve the adhesion of the air barrier layer to another component of the tire. An exemplary primer layer may include a composition including butyl rubber, such as those disclosed in U.S. Pat. No. 5,985,981, which is incorporated herein by reference.

As the skilled person will appreciate, release agents, such as silicone or silicone-based compositions, may be used during the tire manufacturing process. As a result, practice of the present invention may include applying the air barrier layer to a layer or film of release agent. In other embodiments, efforts may be made to remove or otherwise treat the release agents prior to application of the air barrier layer. As a result, practice of the present invention may include application of the air barrier layer to a residue of a release agent; for example, a residue resulting from the chemical treatment of a release agent layer or film.

In those embodiments where the air barrier layer derives from a liquid or otherwise Plowable composition, the composition may be applied directly to the tire, or applied to a transfer member, by using a variety of techniques to form a wet or green coating layer. For example, the liquid or flowable composition may be applied by spraying, rollcoating, knife coating, extrusion, or similar techniques. In one or more embodiments, the air barrier composition has a viscosity that is low enough to allow the composition to be spray applied to the innerliner or carcass.

Following application of the air barrier layer to the interior of the tire, further steps may be taken to expedite drying or curing of the air barrier layer. In certain embodiments, the composite (i.e. tire with air barrier layer) is allowed to air dry at standard conditions of temperature and pressure. In other embodiments, the composite is heated (e.g. to 100° C.-150° C.).

Where the air barrier layer is applied to the cured tire via a transfer coating, the solids composition can be mated to the innerliner or carcass layer by using standard techniques that may include, for example, mating the solids composition to the carcass or innerliner and then applying pressure, such as by way of a roller.

Method of Applying Dampening Member

As indicated above, the dampening element associated with the tires of this invention is applied after a cured tire is provided. In other words, the dampening element is applied to a tire that has undergone the vulcanization (i.e. curing) process associated with the manufacture of the tire.

Following application of the air barrier layer, the dampening element is applied to the interior of the tire by applying the dampening element directly or indirectly to the air barrier layer. In one or more embodiments, the dampening element is applied directly to air barrier layer while the air barrier composition is in a liquid or semi-liquid state. This may include the presence of liquid solvents or carriers within the air barrier composition. In other embodiments, the air barrier composition has a degree of tack, even in it dry or cured state (i.e. has pressure sensitive adhesive properties), and therefore, in certain embodiments, the damper can be applied to the air barrier layer while the air barrier layer is in its dried, solid or cured state. In one or more embodiments, one or more properties of the air barrier coating composition, such as the viscosity of the air barrier coating composition, is modified in order to achieve improved tack properties that facilitate adhesion of the dampening element.

In one or more embodiments, the dampening element is applied indirectly to the air barrier layer. As mentioned above, in one or more embodiments, an adhesive is employed to mate and/or bond the dampening element to the air barrier layer (i.e. an adhesive is applied interior to the air barrier layer). Thus, an adhesive layer is disposed below the air barrier (i.e. interior to the air barrier layer). As suggested above, the adhesive layer may derive from or include pressure sensitive adhesives, as well as the adhesive cements. These adhesives may include olefin-based adhesives, diene-based adhesives, acrylate-based pressure sensitive adhesives, polyurethanes, and epoxies. Specific examples of adhesives include synthetic-rubber-based adhesive including those dissolved by an organic solvent as well as water borne latexes, and acrylate or rubber-based pressure-sensitive adhesive tapes. The skilled person will be able to readily determine an appropriate method for applying the adhesive layer depending on the nature of the adhesive. For example, solvent-borne or liquid-based adhesives can be applied by spraying, brushing or other coating techniques. Hot-melt adhesives can also be applied by using extrusion techniques. And, tapes or other solid forms of pressure sensitive adhesives can applied by using conventional techniques.

In one or more embodiments, the dampening element is applied to the interior of the tire as a pre-formed element such as a solid foam strip or belt. In other embodiments, the dampening element is formed in situ; e.g. a foam forming composition is applied to the interior of the tire and allowed to foam and form the dampening element.

Following application of the dampening element to the air barrier layer, further steps may be taken to expedite drying or curing of the air barrier layer. In certain embodiments, the composite (i.e. tire with air barrier layer and damper) are allowed to air dry at standard conditions of temperature and pressure. In other embodiments, the composite is heated (e.g. to 100° C.-150° C.).

INDUSTRIAL APPLICABILITY

In one or more embodiments, tires of the present invention, which may also be referred to as pneumatic tires, may include passenger tires, truck/bus tires, off-road tires, agricultural tires and industrial tires. These tires and their common and distinct features are well known in the art. For example, agricultural and industrial tires include those described in, for example, U.S. Patent Publication No. 2005/0139302 A1, and U.S. Pat. Nos. 3,844,326, 4,202,391, 4,611,647, 4,791,971, 4,649,976, 5,046,541, 5,063,573, 5,188,683, 5,337,814, 5,337,816, 5,421,388, 5,464,050, 5,901,765, 6,179,027, 6,260,594, 6,263,933, 6,450,221, and 6,481,479, each of which is hereby incorporated by reference. All terrain or off-road tires include those described in, for example, U.S. Pat. Nos. 4,881,586, 5,259,429, 5,318,086, 5,375,640, 6,293,323, 6,298,890, 6,401,774, 6,799,617, and 6,929,044, each of which is hereby incorporated by reference.

Various modifications and alterations that do not depart from the scope and spirit of this invention will become apparent to those skilled in the art. This invention is not to be duly limited to the illustrative embodiments set forth herein.

What is claimed is:

1. A method of preparing a tire, the method comprising steps of:
   (i) providing a cured tire, the cured tire including a first bead, a second bead, a carcass layer extending from the first bead to the second bead, and an innerliner layer disposed interior to the carcass layer;
   (ii) directly applying an air barrier composition, which is distinct from the innerliner layer, to at least a portion of the innerliner layer of the cured tire to thereby form an air barrier layer, where the air barrier layer is in a cured state;
   (iii) providing a dampening member as a pre-formed element; and
   (iv) directly applying the dampening member as the pre-formed element to the air barrier layer in the cured state, such that the dampening member is not co-cured with the air barrier layer in the cured state, without any intervening layer between the dampening member and the air barrier layer.

2. The method of claim 1, where the dampening member is a foam.

3. The method of claim 1, where the dampening member is a polyurethane foam.

4. The method of claim 1, where the dampening member is a foamed silicone rubber.

5. The method of claim 1, where the air barrier composition includes a phase polymeric layer having low permeability to air.

6. The method of claim 1, where the air barrier composition includes a phase-separated blend of elastomer and thermoplastic resin.

7. The method of claim 1, where the air barrier composition includes a first phase with a polyurethane and a second phase with a polysulfide elastomer.

8. The method of claim 1, where the step of directly applying the dampening member forms an assembly consisting of the air barrier layer and the dampening member.

* * * * *